(12) United States Patent
Yamasaki et al.

(10) Patent No.: US 11,150,142 B2
(45) Date of Patent: Oct. 19, 2021

(54) THERMOCOUPLE-FIXING JIG (71) Applicant: TOKYO ELECTRON LIMITED, Tokyo (JP)

(72) Inventors: Hideaki Yamasaki, Nirasaki (JP); Takashi Mochizuki, Nirasaki (JP); Takeshi Itatani, Nirasaki (JP)

(73) Assignee: TOKYO ELECTRON LIMITED, Tokyo (JP)

( * ) Notice: Subject to any disclaimer, the term of this patent is extended or adjusted under 35 U.S.C. 154(b) by 169 days.

(21) Appl. No.: 16/371,739

(22) Filed: Apr. 1, 2019

(65) Prior Publication Data
US 2019/0301947 A1 Oct. 3, 2019

(30) Foreign Application Priority Data
Apr. 3, 2018 (JP) .............................. JP2018-071480

(51) Int. Cl.
*G01K 7/02* (2021.01)
*G01K 1/14* (2021.01)
*G01K 13/00* (2021.01)

(52) U.S. Cl.
CPC ....... *G01K 7/02* (2013.01); *G01K 1/14* (2013.01)

(58) Field of Classification Search
USPC ........................................ 374/179, 208, 141
See application file for complete search history.

(56) References Cited

U.S. PATENT DOCUMENTS

2007/0153872 A1\* 7/2007 Wu .................. G01K 1/143
374/148
2014/0204975 A1\* 7/2014 Kosakai ............. H05B 1/0233
374/179

FOREIGN PATENT DOCUMENTS

| CN | 1982858 A | 6/2007 |
|---|---|---|
| CN | 203629702 U | 6/2014 |
| JP | 2002-110524 A1 | 4/2002 |
| JP | 2015-214716 A1 | 12/2015 |
| KR | 10-0645929 B1 | 11/2006 |

\* cited by examiner

*Primary Examiner* — Mirellys Jagan
(74) *Attorney, Agent, or Firm* — Nath, Goldberg & Meyer; Jerald L. Meyer; Tanya E. Harkins (57) ABSTRACT

There is provided a thermocouple-fixing jig for fixing a thermocouple to a linear heater, the thermocouple-fixing jig comprising a first member and a second member configured to hold the linear heater therebetween, wherein the second member comprises a first holding portion and a second holding portion that hold a temperature detection part of the thermocouple.

6 Claims, 6 Drawing Sheets

THERMOCOUPLE-FIXING JIG

CROSS-REFERENCE TO RELATED APPLICATION

This application is based upon and claims the benefit of priority from Japanese Patent Application No. 2018-071480, filed on Apr. 3, 2018, the entire contents of which are incorporated herein by reference.

TECHNICAL FIELD

The present disclosure relates to a thermocouple-fixing jig.

BACKGROUND

In a semiconductor device manufacturing process, there is, for example, a process of forming various thin films, and in a film-forming apparatus that performs such film formation, a linear heater such as a sheath heater is used in order to heat an object to be processed or a member.

Conventionally, there is a film-forming apparatus in which an annular insulating member is provided around a shower plate that supplies a processing gas into a processing container in which a film forming process is performed, and a linear heater is provided around the entire inner circumference of the insulating member. In this apparatus, by heating the insulating member to a predetermined temperature using the linear heater, peeling of a film attached to the insulating member is prevented. When heating is performed in this manner using a heater, generally, a thermocouple is inserted into a jig that fixes the heater to measure the temperature of the heater, and an output of the heater is controlled on the basis of the measurement result.

Meanwhile, a technique of disposing a temperature measurement part of a sheath-type thermocouple in a recess formed in a heat equalizing plate and pressing and fixing the temperature measurement part using a metal chip and a pressing jig is known for suppressing, for example, variation in the measurement of the temperature of the thermocouple.

SUMMARY

The present disclosure provides a thermocouple-fixing jig capable of suppressing temperature measurement variation of a linear heater when measuring the temperature of the linear heater using a thermocouple.

According to one embodiment of the present disclosure, there is provided a thermocouple-fixing jig for fixing a thermocouple to a linear heater, the thermocouple-fixing jig including: a first member and a second member configured to hold the linear heater therebetween, wherein the second member comprises a first holding portion and a second holding portion that hold a temperature detection part of the thermocouple.

BRIEF DESCRIPTION OF DRAWINGS

The accompanying drawings, which are incorporated in and constitute a part of the specification, illustrate embodiments of the present disclosure, and together with the general description given above and the detailed description of the embodiments given below, serve to explain the principles of the present disclosure.

DETAILED DESCRIPTION

Reference will now be made in detail to various embodiments, examples of which are illustrated in the accompanying drawings. In the following detailed description, numerous specific details are set forth in order to provide a thorough understanding of the present disclosure. However, it will be apparent to one of ordinary skill in the art that the present disclosure may be practiced without these specific details. In other instances, well-known methods, procedures, systems, and components have not been described in detail so as not to unnecessarily obscure aspects of the various embodiments.

Hereinafter, embodiments will be described in detail with reference to the accompanying drawings.

<Film-Forming Apparatus>

First, an example of a film-forming apparatus to which a thermocouple-fixing jig according to an embodiment is applied will be described. Here, the case in which a Ti film is formed on a semiconductor wafer (also simply referred to as a "wafer") W as an object to be processed through plasma CVD will be described by way of an example.

Figure 1:
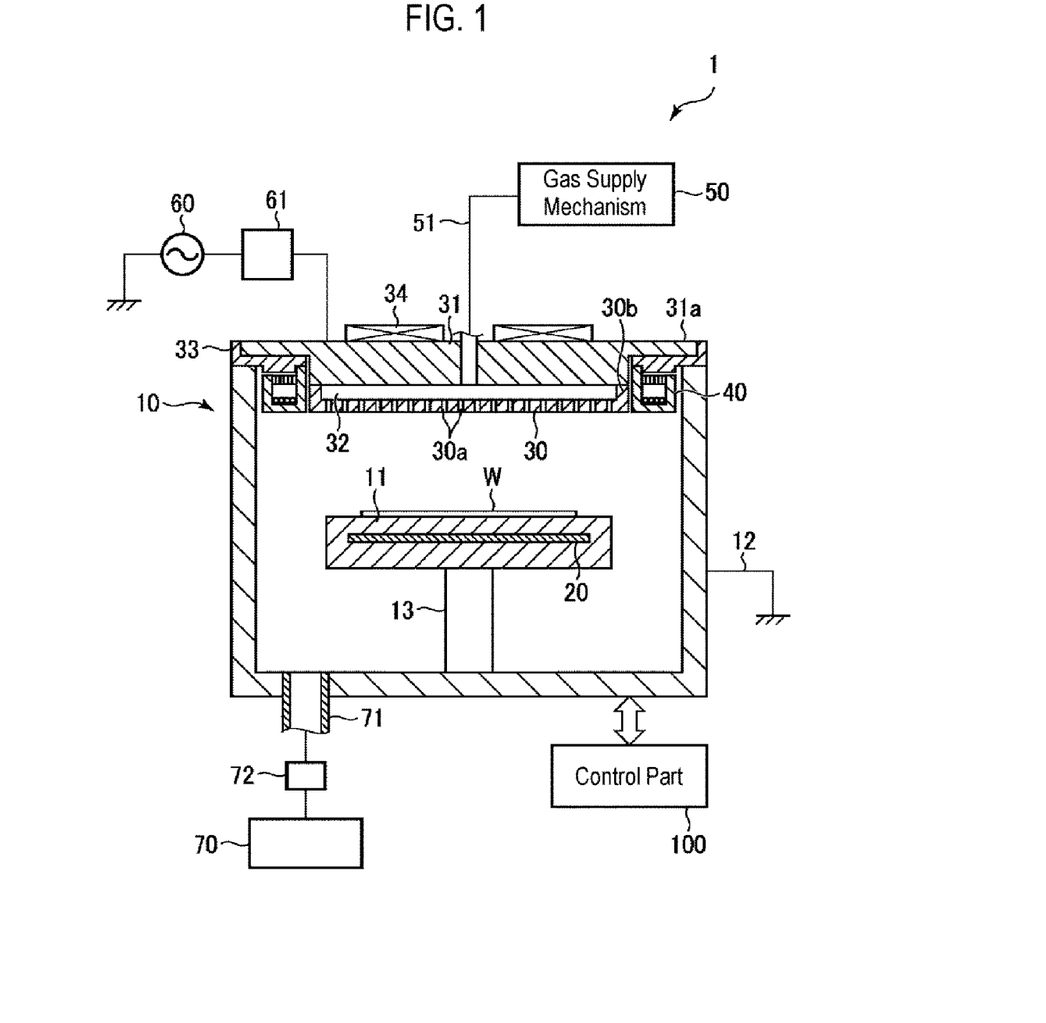
FIG. 1 is a cross-sectional view illustrating an example of a film-forming apparatus to which a thermocouple-fixing jig according to an embodiment is applied.

FIG. 1 is a cross-sectional view illustrating an example of a film-forming apparatus to which a thermocouple-fixing jig according to an embodiment is applied. The film-forming apparatus 1 includes a substantially cylindrical processing container 10 having a bottom and an open upper part, and a mounting table 11 provided in the processing container 10 and configured to mount a wafer W thereon. The processing container 10 is grounded by a ground line 12.

The mounting table 11 is formed of ceramics such as AlN, and a coating film (not illustrated) made of a conductive material is formed on the surface thereof. The lower surface of the mounting table 11 is supported by a support member 13 formed of a conductive material and is electrically connected thereto. The lower end of the support member 13 is supported by the bottom surface of the processing container 10 and is electrically connected thereto. Therefore, the mounting table 11 is grounded via the processing container 10, and functions as a lower electrode that forms a pair with the upper electrode 30, which will be described later.

A heater 20 is embedded in the mounting table 11, and a wafer W placed on the mounting table 11 is heated to a predetermined temperature by the heater 20. In addition, the mounting table 11 is provided with a clamp ring (not illustrated), which presses the outer peripheral portion of the wafer W so as to fix the wafer W on the mounting table 11 and a lift pin (not illustrated) for transferring a wafer W to and from a transport mechanism (not illustrated) provided outside the processing container 10.

In the upper part of the processing container 10, a substantially disk-shaped upper electrode 30 is provided so as to face the mounting table 11 as a lower electrode. The upper electrode 30 is made of, for example, a conductive metal such as nickel (Ni).

Multiple gas supply holes 30a are formed in the upper electrode 30. A protrusion 30b protruding upward is formed around the entire circumference of the outer peripheral edge portion of the upper electrode 30. The protrusion 30b of the upper electrode 30 is attached to the lid 31, and the space surrounded by the lid 31 and the upper electrode 30 becomes a gas diffusion chamber 32.

In the upper surface of the lid 31, an engagement portion 31a protrudes outward from the outer peripheral portion of the lid 31, and the engagement portion 31a is engaged with the upper end of the processing container 10 via an annular support member 33. The lid 31 and the engagement portion 31a constitute a ceiling wall. Like the upper electrode 30, the lid 31 and the engagement portion 31a are also formed of a conductive metal such as nickel.

The support member 33 is made of an insulating material such as quartz. Therefore, the upper electrode 30 and the processing container 10 are electrically insulated. Further, a heater 34 is provided on the upper surface of the lid 31. The heater 34 heats the lid 31 and the upper electrode 30 to a predetermined temperature.

An annular insulating member 40 having a linear heater 41 embedded therein is provided outside the protrusion 30b of the upper electrode 30 so as to surround the outer peripheral portion of the upper electrode 30.

A high-frequency power supply 60 is electrically connected to the lid 31 via a matching device 61 to supply high-frequency power to the upper electrode 30 via the lid 31 in order to generate plasma. The high-frequency power supply is configured to output, for example, a frequency of 100 kHz to 100 MHz (e.g., in this embodiment, high-frequency power of 450 kHz). The matching device 61 matches the internal impedance of the high-frequency power supply 60 with the load impedance.

A gas supply pipe 51 is connected to the gas diffusion chamber 32 through the lid 31. A gas supply mechanism 50 is connected to the gas supply pipe 51. The processing gas supplied from the gas supply mechanism 50 is supplied to the gas diffusion chamber 32 via the gas supply pipe 51. The processing gas supplied to the gas diffusion chamber 32 is introduced into the processing container 10 through the gas supply holes 30a. Therefore, the upper electrode 30 functions as a shower plate for introducing the processing gas into the processing container 10.

The gas supply mechanism 50 includes gas supply sources of, for example, $TiCl_4$ gas as a source gas for forming a Ti film, $H_2$ (hydrogen) gas as a reducing gas, and Ar gas for plasma generation, individual pipes that guide the gases to gas supply pipes, and valves or flow rate controllers provided in the individual pipes.

An exhaust mechanism 70 is connected to the bottom surface of the processing container 10 via an exhaust pipe 71 to evacuate the inside of the processing container 10. The exhaust pipe 71 is provided with an automatic pressure control valve (APC) 72 to control the pressure inside the processing container 10.

The film-forming apparatus 1 includes a control part 100. The control part 100 is constituted with a computer and includes a main control part constituted with a CPU configured to control respective components of the film-forming apparatus 1 (e.g., the heater 20, the linear heater 41, the high-frequency power supply 60, the matching device 61, the exhaust mechanism 70, the automatic pressure control valve 72, other valves, and a flow rate controller), an input device such as a keyboard or a mouse, an output device, a display device, and a storage device. The main control part of the control part 100 causes the film-forming apparatus 1 to execute a predetermined operation based on a processing recipe read from a storage medium by setting the storage medium in which the processing recipe is stored in the storage device.

Next, the above-described insulating member 40 will be described.

Figure 2:
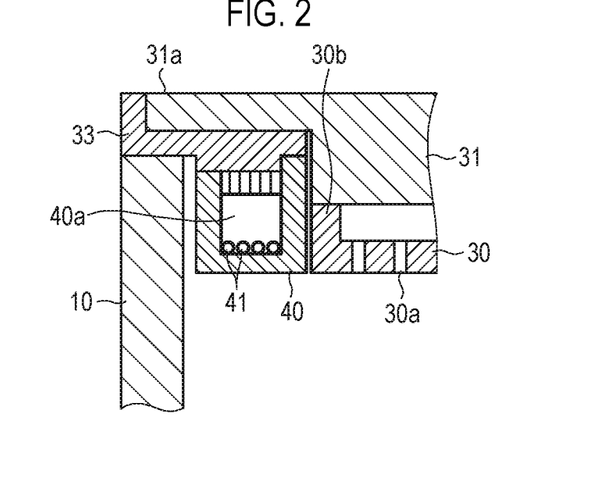
FIG. 2 is a cross-sectional view illustrating a linear heater arrangement portion in which a thermocouple-fixing jig according to an embodiment is used in the film-forming apparatus of FIG. 1.

The insulating member 40 is made of, for example, quartz. As illustrated in FIG. 2, the lower end surface of the insulating member 40 is set such that the height thereof in the vertical direction is the same as that of the lower end surface of the upper electrode 30, so that the plasma generated in the processing container 10 is not unevenly distributed when high-frequency waves are applied between the lower electrode and the upper electrode 30. The insulating member 40 is supported by the above-described support member 33, and is disposed such that a gap of a predetermined spacing is formed between the outer surface of the insulating member 40 and the inner surface of the processing container 10. In addition, a gap is formed between the upper electrode 30 and the insulating member 40.

Figure 3:
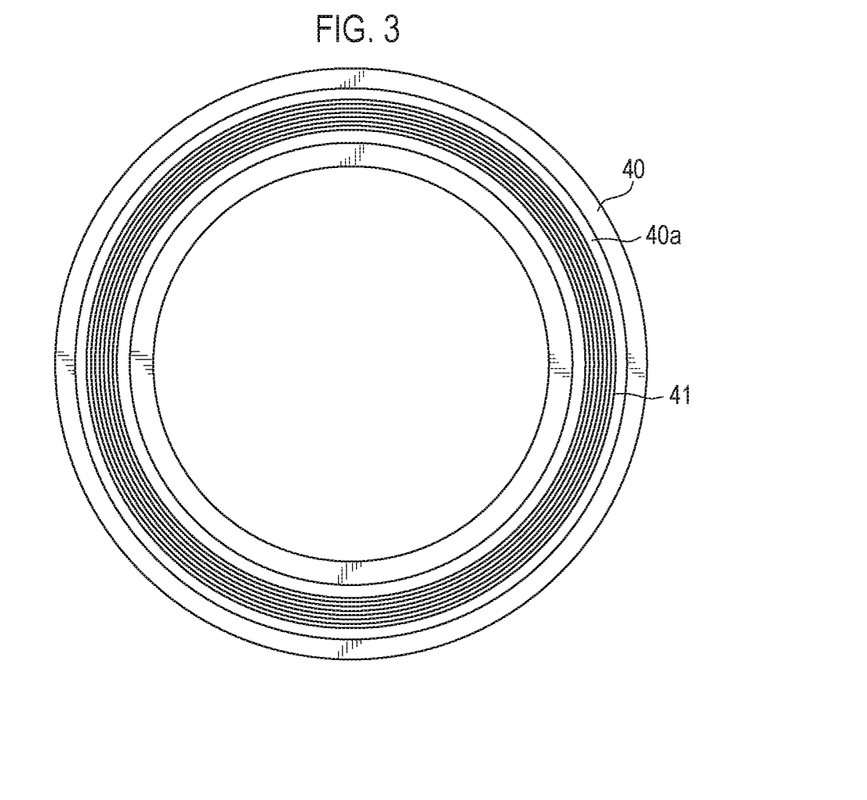
FIG. 3 is a plan view illustrating a linear heater in which a thermocouple-fixing jig according to an embodiment is used in the film-forming apparatus of FIG. 1.

As illustrated in FIG. 2, in the space 40a inside the insulating member 40, a linear heater 41 is arranged in a spiral shape over the entire circumference of the inner space 40a, as illustrated in FIG. 3. The linear heater 41 is configured as a sheath heater. The linear heater 41 generates heat by being supplied with power from a heater power supply (not illustrated), and the insulating member 40 is heated to a predetermined temperature by the heat generated by the heater 41.

In the film-forming apparatus configured as described above, first, a wafer W is loaded into the processing container 10 and placed on the mounting table 11. At this time, the mounting table 11 is maintained at a predetermined temperature by the heater 20, and the wafer W placed on the mounting table 11 is heated to a predetermined temperature. Then, for example, $TiCl_4$ gas, $H_2$ gas, and Ar gas are supplied from the gas supply mechanism 50 into the processing container 10 at a predetermined flow rate while evacuating the inside of the processing container 10 using the exhaust mechanism 70 to control the pressure inside the processing container 10 to a predetermined pressure.

In this state, high-frequency electric power is applied from the high-frequency power supply 60 to the upper electrode 30 to form a high-frequency electric field between the upper electrode 30 and the mounting table 11 as the lower electrode. The processing gas is turned into plasma by the high-frequency electric field, and a Ti film is formed on the surface of the wafer W through plasma CVD.

At this time, reaction products during film formation adhere to the upper electrode 30 and the insulating member 40, forming a film. When the film quality of this film is poor, it peels off and becomes particles. Since the upper electrode 30 is heated by the heater 34 provided in the lid 31, the adhered film has a film quality which makes it difficult to be peeled off. However, since the insulating member 40 is not sufficiently heated by the heater 34, the film quality of the film formed on the insulating member 40 becomes worse to be easily peeled off under a condition where only the heater 34 is used. Therefore, by providing the linear heater 41 and heating the insulating member 40 to a predetermined temperature, the film quality of the film adhered to the insulating member 40 is improved.

The temperature control of the linear heater 41 is performed by fixing a thermocouple to the linear heater using the thermocouple-fixing jig according to an embodiment and controlling the output of the heater power supply (not illustrated) using the control part 100 based on a temperature signal from the thermocouple.

<Thermocouple-Fixing Jig>

Next, a thermocouple-fixing jig according to an embodiment will be described.

Figure 4:
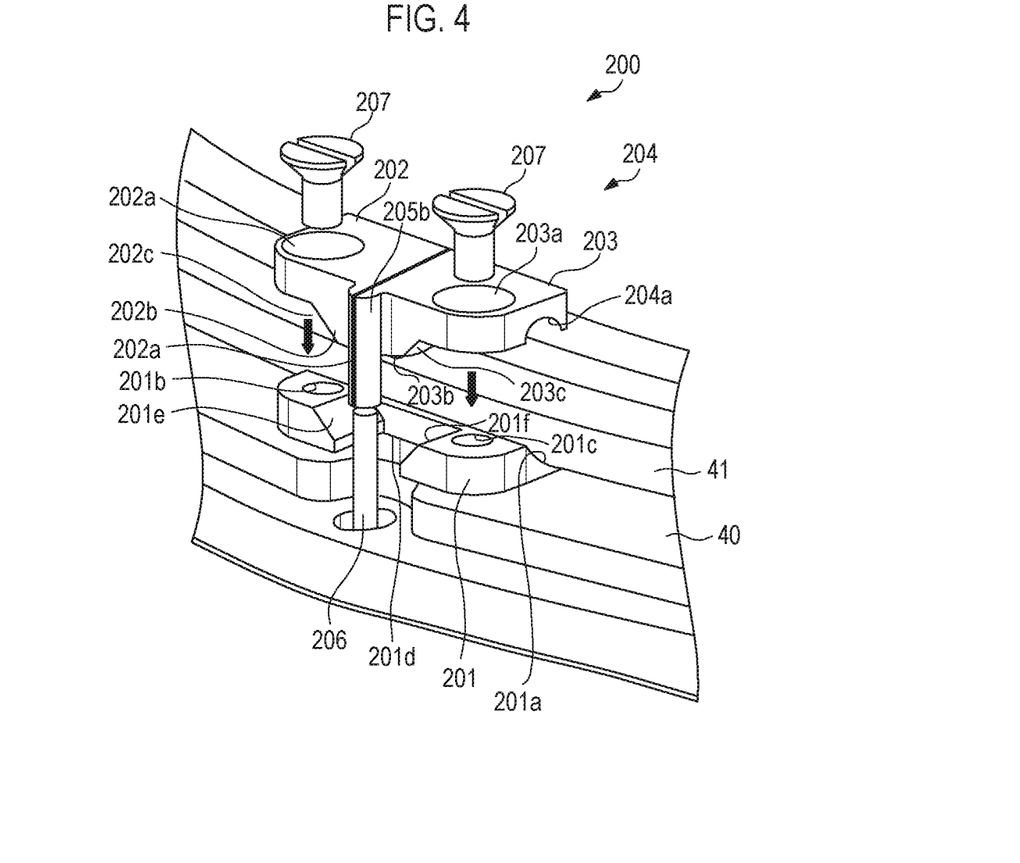
FIG. 4 is a perspective view for describing a mounted state of a thermocouple-fixing jig according to an embodiment.
Figure 5:
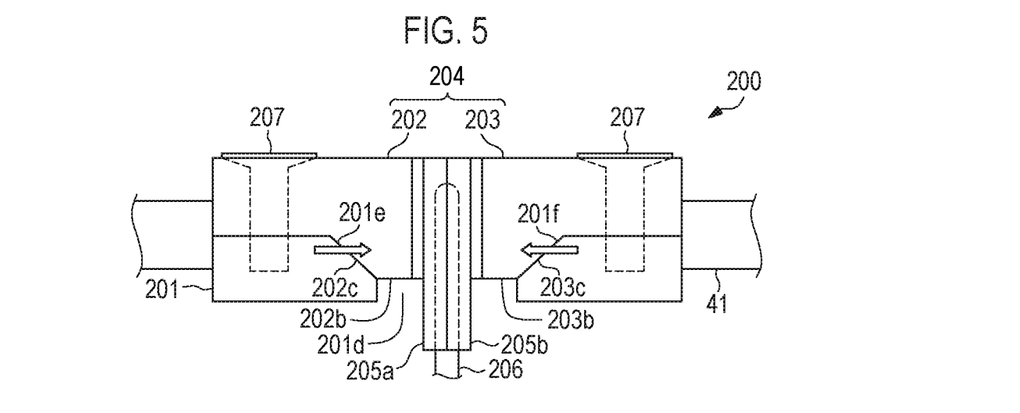
FIG. 5 is a front view illustrating the thermocouple-fixing jig according to an embodiment.
Figure 6:
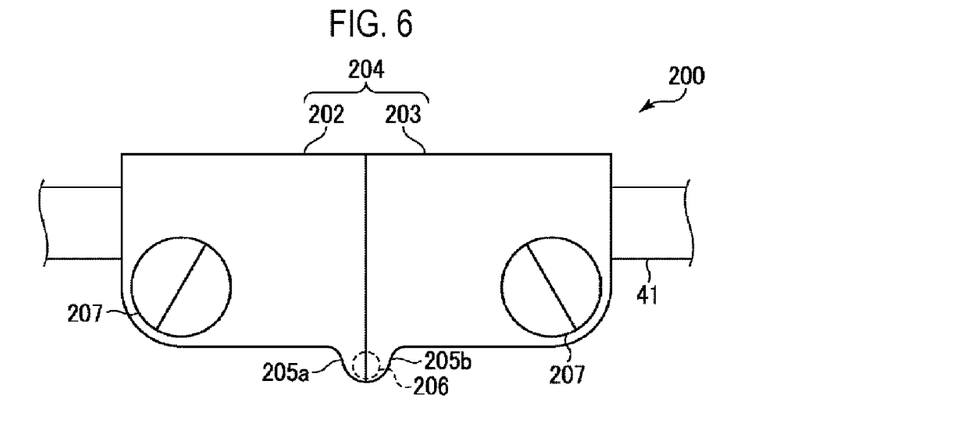
FIG. 6 is a plan view illustrating the thermocouple-fixing jig according to an embodiment.
Figure 7:
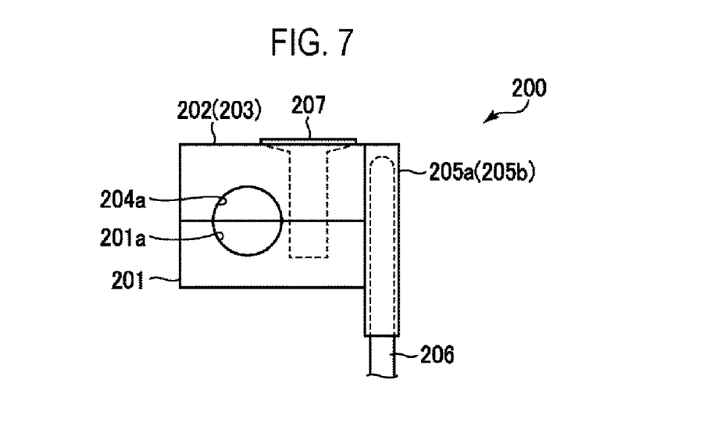
FIG. 7 is a side view illustrating the thermocouple-fixing jig according to an embodiment.

FIG. 4 is a perspective view for describing a mounted state of a thermocouple-fixing jig according to an embodiment. FIG. 5 is a front view illustrating the thermocouple-fixing jig according to an embodiment. FIG. 6 is a plan view illustrating the thermocouple-fixing jig according to an embodiment. FIG. 7 is a side view illustrating the thermocouple-fixing jig according to an embodiment.

The thermocouple-fixing jig 200 of the present embodiment is configured to fix a thermocouple for measuring the temperature of the linear heater 41 to the linear heater 41 so that the heat of the linear heater 41 can be transferred to the thermocouple, and is made of a metal material having high heat resistance and corrosion resistance, for example, a nickel alloy. The thermocouple-fixing jig 200 includes a base member 201 (a first member) provided below the linear heater 41 and a holding member 204 (a second member) provided above the base member 201 with the linear heater 41 interposed therebetween so as to hold a thermocouple temperature detection part.

The base member 201 is provided under the linear heater 41 in the longitudinal direction of the linear heater 41. On the upper side of the base member 201, a groove 201a into which the linear heater 41 is fitted is formed. In addition, screw holes 201b and 201c are formed in the upper portion of the base member 201 in a direction orthogonal to the longitudinal direction of the linear heater 41.

The holding member 204 is divided into a first holding member 202 and a second holding member 203 at the center of the linear heater 41 in the longitudinal direction. A groove 204a into which the linear heater 41 is fitted is formed in the lower side of the holding member 204 across the first holding member 202 and the second holding member 203. Screw holes 202a and 203a are provided through the first holding member 202 and the second holding member 203, respectively, in a direction orthogonal to the longitudinal direction of the linear heater 41.

By screwing a countersunk screw 207 into the screw hole 202a and the screw hole 201b and another countersunk screw 207 into the screw hole 203a and the screw hole 201c, the first holding member 202 and the second holding member 203 are fastened to the base member 201.

The first holding member 202 has a first holding portion 205a protruding from the front surface thereof and the second holding member 203 has a second holding portion 205b protruding from the front surface thereof. Each of the first holding portion 205a and the second holding portion 205b is formed as an elongated body in which a groove, into which the temperature detection part of the thermocouple 206 is fitted, is formed perpendicular to the linear heater 41. When the first holding member 202 and the second holding member 203 are fastened to the base member 201, the thermocouple 206 is held between the grooves of the first holding portion 205a and the second holding portion 205b. The first holding portion 205a and the second holding portion 205b have a length longer than at least the temperature detection part (a temperature measurement part) of the thermocouple 206.

The first holding member 202 and the second holding member 203 have mirror symmetrical shapes, to which heat is evenly transferred from the linear heater 41, thus making the temperature uniform.

Figure 8:
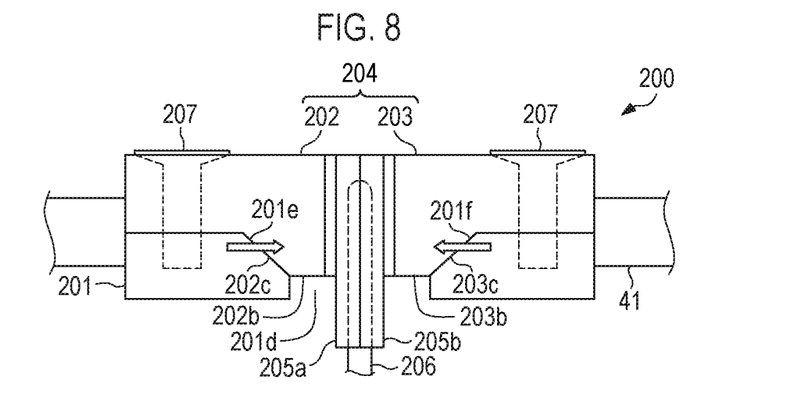
FIG. 8 is a view for describing a state when a first holding member and a second holding member are screwed in the thermocouple-fixing jig according to an embodiment.

A recess 201d is formed in the central portion of the front face of the base member 201, and a surface at one side and a surface at opposite side defining the recess 201d are formed as a downward-fitting tapered faces 201e and 201f (a first tapered face and a second tapered face). Meanwhile, protrusions 202b and 203b protruding downward are formed in the lower portions of the first holding member 202 and the second holding member 203 in the vicinity of these mating surfaces, respectively. Tapered faces 202c and 203c (a third tapered face and a fourth tapered face) are formed on the protrusions 202b and 203b, respectively. When the first holding member 202 and the second holding member 203 are screwed to the base member 201 by the countersunk screws 207 and move downward, the tapered faces 202c and 203c are guided by the downward-fitting tapered faces 201e and 201f, respectively. As a result, as illustrated in FIG. 8, the first and second holding members 202 and 203 are automatically downwardly-fitted on the tapered faces 201e and 201f, and forces moving the first and second holding members 202 and 203 in a direction approaching each other act on the first and second holding members 202 and 203, so that positioning of the first and second holding members 202 can be performed. That is, when the first holding member 202 and the second holding member 203 are screwed, the first holding portion 205a and the second holding portion 205b hold the temperature detection part of the thermocouple 206 at a predetermined position.

Figure 9:
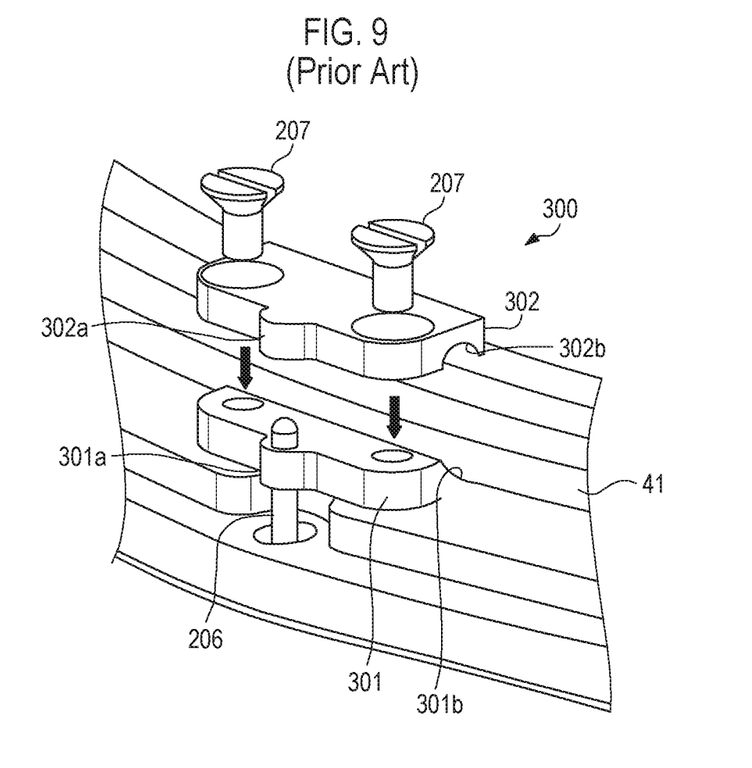
FIG. 9 is a perspective view for describing the mounted state of a conventional thermocouple-fixing jig.

A conventional thermocouple-fixing jig is, for example, as illustrated in FIG. 9. That is, the conventional thermocouple-fixing jig 300 illustrated in FIG. 9 includes a base member 301 provided below the linear heater 41, and a cap member 302 provided above the base member 301 with the linear heater 41 interposed therebetween. A thermocouple insertion portion 301a is formed in the base member 301, and a thermocouple is inserted into the thermocouple insertion portion 301a. When the cap member 302 is fixed to the base member by the countersunk screws 207, the cap portion 302a formed to protrude from the cap member 302 is put on the tip portion of the thermocouple 206. Reference numerals 301b and 302b denote grooves that hold the linear heater 41.

However, with such a thermocouple-fixing jig 300, the state of contact between the thermocouple 206 and the fixing jig 300 and the state of contact between the fixing jig 300 and the linear heater 41 change whenever the thermocouple 206 is installed. As a result, the measured temperature of the thermocouple 206 changes, and the power supplied to the linear heater 41 varies during the idling in the processing container 10. Such a power variation is not easily eliminated by the conventional technique of pressing and fixing the temperature measurement part (the temperature detection part) of a thermocouple.

In contrast, in the present embodiment, a member corresponding to the conventional cap member 302, which transfers the heat of the linear heater 41 to the thermocouple 206 is configured as the holding member 204, which is divided at the center thereof into the first holding member 202 and the second holding member 203. When the first holding member 202 and the second holding member 203 are screwed to the base member 201, the temperature detection part of the thermocouple 206 is sandwiched between the first holding portion 205a of the first holding member 202 and the second holding portion 205b of the second holding member 203. This makes the contact property between the thermocouple 206 and the thermocouple-fixing jig 200 good, so that the first holding portion 205a and the second holding portion 205b can be brought into even contact with the thermocouple 206. Therefore, even if the insertion position of the thermocouple 206 or the position at which the linear heater 41 and the thermocouple-fixing jig 200 are in contact with each other deviate, it is possible to suppress a variation in the measured temperature.

The first holding member 202 and the second holding member 203 have a mirror symmetrical shape, to which heat is evenly transferred from the linear heater 41, making the temperature uniform. As a result, it is possible to suppress variation in measured temperature due to heat capacity.

Furthermore, since the downward-fitting tapered faces 201e and 201f are formed in the base member 201, the first and second holding members 202 and 203 are automatically downwardly fitted on the downward-fitting tapered faces 201e and 201f, and forces moving the first and second holding members 202 and 203 inward act on the first and second holding members 202 and 203, thereby positioning the first and second holding members 202 and 203. Therefore, it is possible to secure the reproducibility of the assembly of the thermocouple-fixing jig 200, and thus it is possible to suppress variation in the measured temperature due to a variation in assembly.

Figure 10:
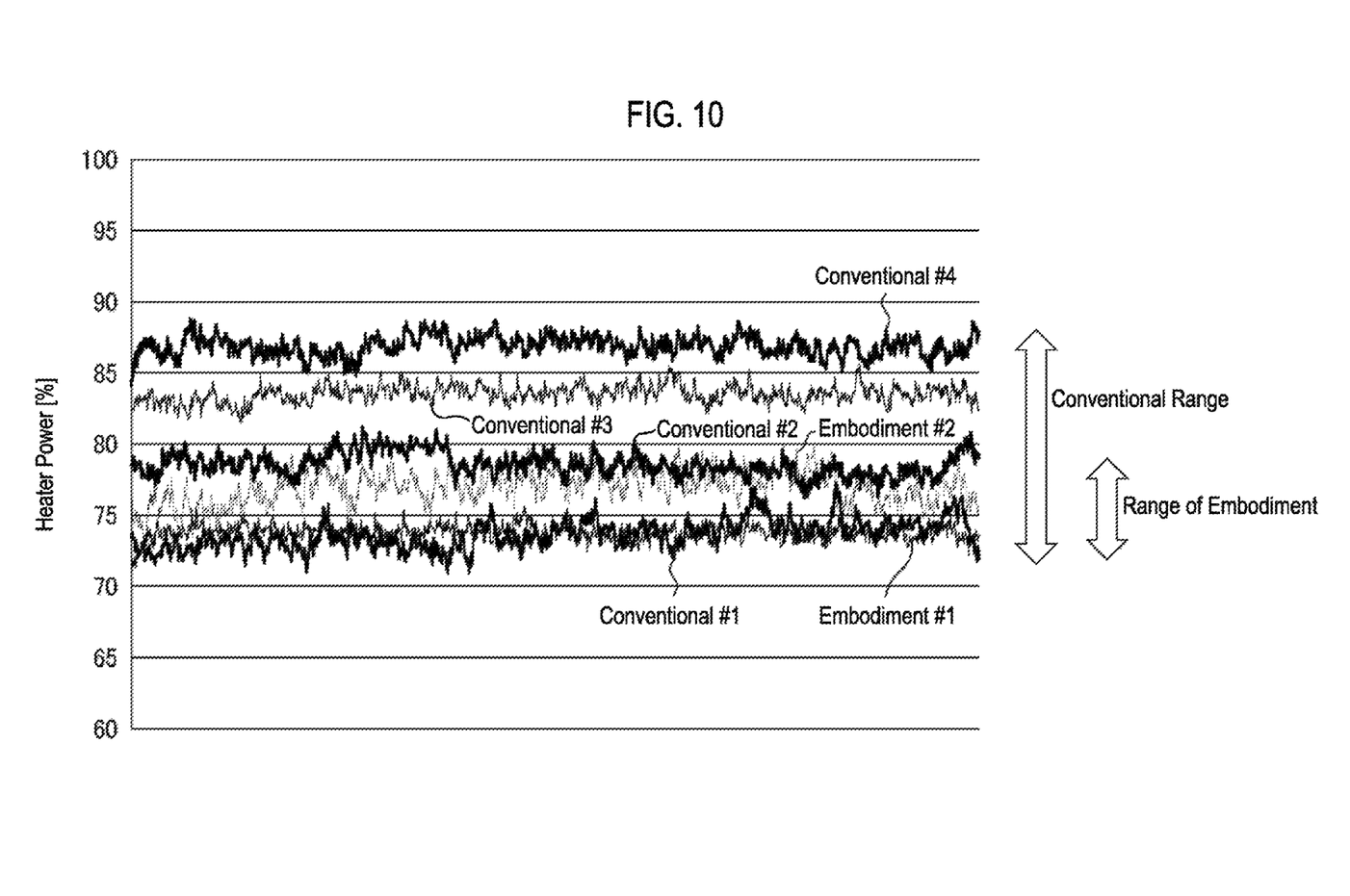
FIG. 10 is a diagram comparing variations in heater power between the cases in which conventional thermocouple-fixing jigs are used and the cases in which thermocouple-fixing jigs according to embodiments of the present disclosure are used.

Actually, in the case where the conventional thermocouple-fixing jig 300 illustrated in FIG. 9 was used for the linear heater 41 of FIG. 1 and in the case where the thermocouple-fixing jig 200 according to the present embodiment illustrated in FIGS. 4 to 7 was used, thermocouples were installed multiple times and the power of the linear heaters 41 was measured each time. The results are shown in FIG. 10. As shown in FIG. 10, conventionally, the heater power varied within the range of 71 to 88%, but in the present embodiment, it was possible to suppress variation to within the range of 71 to 80%.

<Other Application>

Although the embodiments have been described above, it should be considered that the embodiments disclosed herein are examples in all respects and are not restrictive. The above embodiments may be omitted, replaced, or modified in various forms without departing from the scope and spirit of the appended claims.

For example, in the above-described embodiments, the case where the present disclosure is applied to a linear heater used for an annular insulating member provided around a shower plate of a film-forming apparatus has been described, but the present disclosure is not limited thereto. The present disclosure is applicable as long as it is used for fixing a thermocouple to a linear heater.

Further, in the above-described embodiments, an example in which a holding member having a holding portion is provided on a base member has been illustrated, but the present invention is not limited thereto. The holding portion may be formed on the base member, and only the holding portion may be divided into two.

According to the present disclosure, a thermocouple-fixing jig capable of suppressing temperature measurement variation of a linear heater when measuring the temperature of the linear heater using a thermocouple is provided.

While certain embodiments have been described, these embodiments have been presented by way of example only, and are not intended to limit the scope of the disclosures. Indeed, the embodiments described herein may be embodied in a variety of other forms. Furthermore, various omissions, substitutions and changes in the form of the embodiments described herein may be made without departing from the spirit of the disclosures. The accompanying claims and their equivalents are intended to cover such forms or modifications as would fall within the scope and spirit of the disclosures.

What is claimed is:

1. A thermocouple-fixing jig for fixing a thermocouple to a linear heater, the thermocouple-fixing jig comprising:
    a first member and a second member configured to hold the linear heater therebetween,
    wherein the second member comprises a first holding portion and a second holding portion that hold a temperature detection part of the thermocouple,
    wherein the second member comprises a first holding member and a second holding member, such that the second member is divided into the first holding member and the second holding member in a longitudinal direction of the linear heater,
    wherein the first holding member has the first holding portion while the second holding member has the second holding portion, and
    wherein when the first holding member and the second holding member are screwed to the first member, the thermocouple is held by the first holding portion and the second holding portion.

2. The thermocouple-fixing jig of claim 1, wherein the first holding member and the second holding member have mirror symmetrical shapes.

3. The thermocouple-fixing jig of claim 1, wherein the first member is provided with a first tapered face and a second tapered face,
    wherein the first holding member and the second holding member are provided with a third tapered face corresponding to the first tapered face and a fourth tapered face corresponding to the second tapered face, respectively,
    wherein when the first holding member and the second holding member are screwed to and move in a direction approaching the first member, the third tapered face of the first holding member and the fourth tapered face of the second holding member are guided by the first tapered face and the second tapered face, respectively, and
    wherein forces act on the first holding member and the second holding member to move the first holding member and the second holding member in a direction in which the first holding member and the second holding member approach each other so that the temperature detection part of the thermocouple is held at a predetermined position by the first holding portion and the second holding portion.

4. The thermocouple-fixing jig of claim 1, wherein the first holding portion and the second holding portion have a length longer than at least the temperature detection part of the thermocouple.

5. The thermocouple-fixing jig of claim 1, wherein the first holding portion and the second holding portion have grooves that hold the temperature detection part of the thermocouple.

6. The thermocouple-fixing jig of claim 5, wherein each of the first holding portion and the second holding portion is formed as an elongated member extending perpendicularly to the linear heater, and the grooves that hold the temperature detection part of the thermocouple are formed perpendicularly to the linear heater.

* * * * *